Figure 1A:
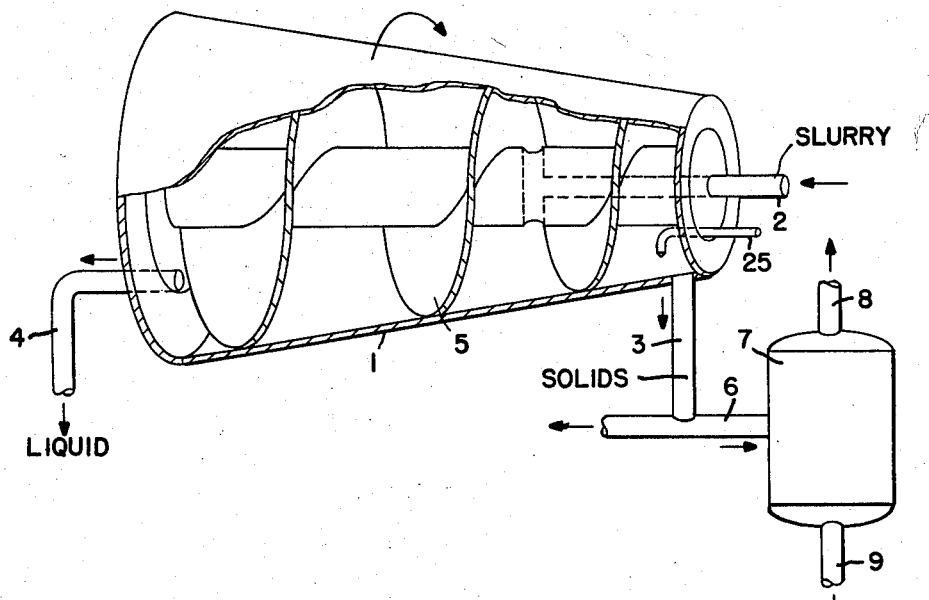

Dec. 15, 1964  J. L. TIEDJE ETAL  3,161,581
CENTRIFUGAL PROCESSING OF TAR SANDS

Filed Aug. 24, 1960  7 Sheets-Sheet 1

John L. Tiedje
John A. Bichard    Inventors
Roger M. Butler
By W.V.T Heeliman Patent Attorney

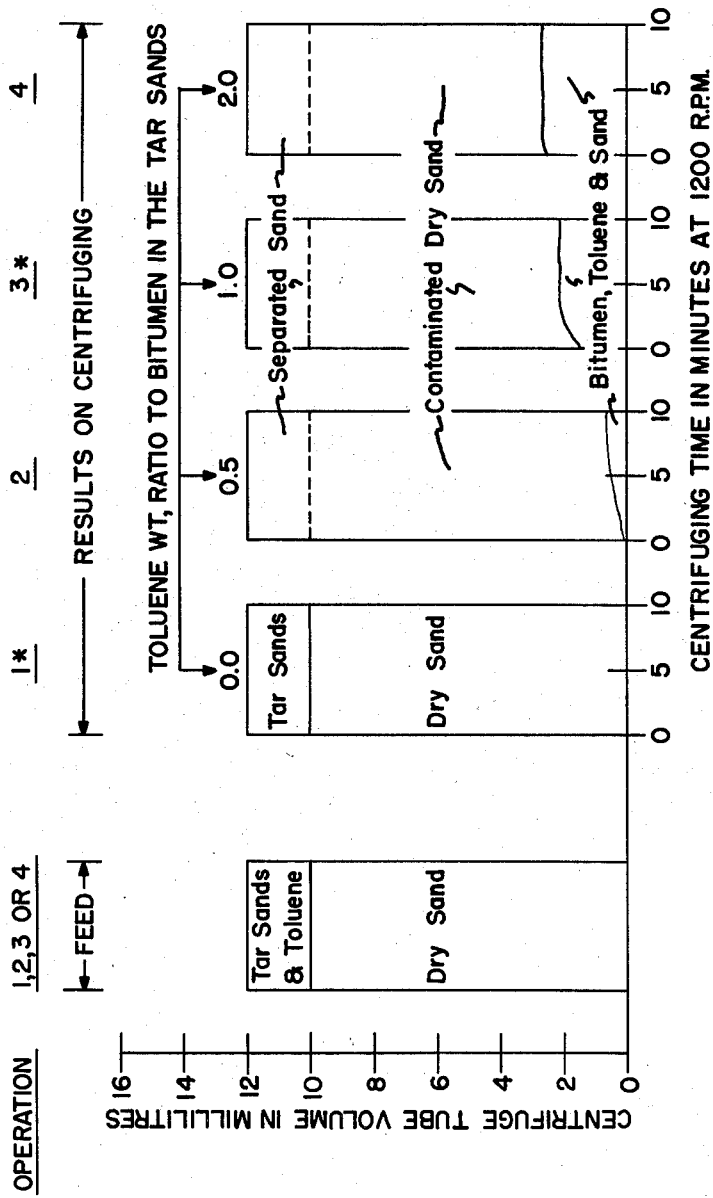

Dec. 15, 1964 J. L. TIEDJE ETAL 3,161,581
CENTRIFUGAL PROCESSING OF TAR SANDS
Filed Aug. 24, 1960 7 Sheets-Sheet 7
FIGURE-7
EXAMPLE-A
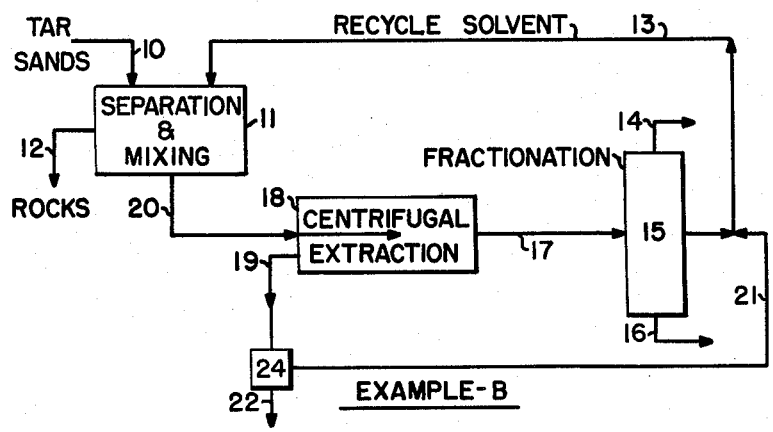
EXAMPLE-B
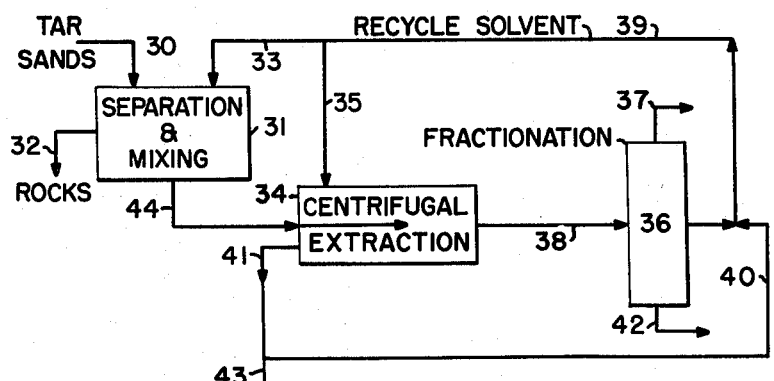
EXAMPLE-C
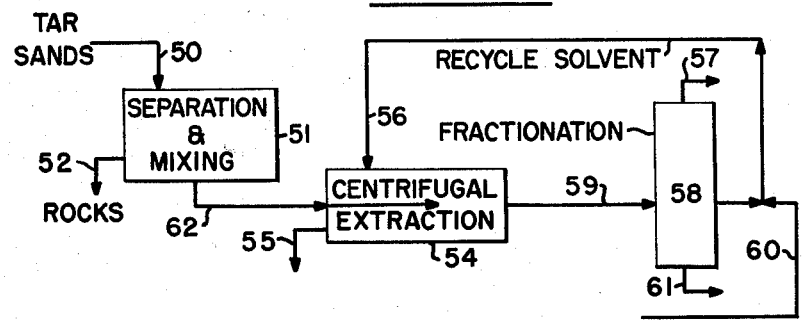
John L. Tiedje
John A. Bichard  Inventors
Roger M. Butler
By W. O. Heilman
Patent Attorney United States Patent Office 3,161,581
Patented Dec. 15, 1964

3,161,581
CENTRIFUGAL PROCESSING OF TAR SANDS
John L. Tiedje, Sarnia, Ontario, John A. Bichard, Point Edward, Ontario, and Roger M. Butler, Sarnia, Ontario, Canada, assignors to Esso Research and Engineering Company, a corporation of Delaware
Filed Aug. 24, 1960, Ser. No. 51,591
4 Claims. (Cl. 208—11)

The present invention is broadly concerned with the recovery of hydrocarbons from tar sands. The invention is particularly concerned with an improved technique of efficiently removing hydrocarbons, such as bitumen, tars, and the like, from tar sands containing the same, such as Athabaska tar sands. In accordance with the present invention, the method comprises an anhydrous separation, utilizing a continuous solid bowl centrifuge and a particular technique.

In various areas of the world, tar sands exist which contain various types of hydrocarbons as, for example, the heavy deposits of Athabaska tar sands existing in Canada. These sands contain tremendous reserves of hydrocarbon constituents. For example, the oil in the sands may vary from about 5% to 21% by volume, generally in the range of about 12% by volume. The gravity of the oil ranges from about 6° to 10° API, generally about 8° API. These sands may lie from about 200 to 300 ft. below an overburden and the beds may range from about 100 to 400 ft. thick. A typical oil recovered from the sands has an initial boiling point of about 300° F., 1.0% distilled to 430° F., 20.0% distilled to 650° F., and 50.0% distilled to 980° F. However, the recovery of hydrocarbons in the past has not been effective to any great extent due to the deficiencies in operating techniques for the recovery of these hydrocarbons. For example, a relatively small amount of clay (less than 1%) in the sand greatly retards recovery of the oil utilizing water techniques. Apparently the oil and the clay form skins which envelop the water and sand resulting in an emulsion of water containing a water-coated sand.

Numerous attempts have been made in the past to recover bitumen from the Athabaska tar sands in a unique manner. For example, it has been suggested that a solvent be added in order to reduce the viscosity of the bitumen, and in conjunction with water, to float the bitumen solvent mixture away from the sand. Although this technique achieves a good separation of clean sand, the addition of water results in problems with the formation of stable emulsions and sludges which have been very difficult to separate. Thus, extensive supplementary processing has been required in order to avoid large oil losses. In accordance with a specific adaptation of the present invention, these difficulties are overcome by an anhydrous separation technique, using a continuous solid bowl centrifuge. In essence, the operation comprises mixing the tar sands wtih a quantity of a suitable solvent and then introducing the mixture at an intermediate point in the centrifuge. Gravitational forces remove the hydrocarbons outwardly toward the wide end of the bowl and the sand is moved by a screw conveyor up the incline toward the narrow end. Solvent introduced at the narrow end gives the sand a countercurrent wash and an efficient recovery of the oil from the sand is secured.

Figure 1B:
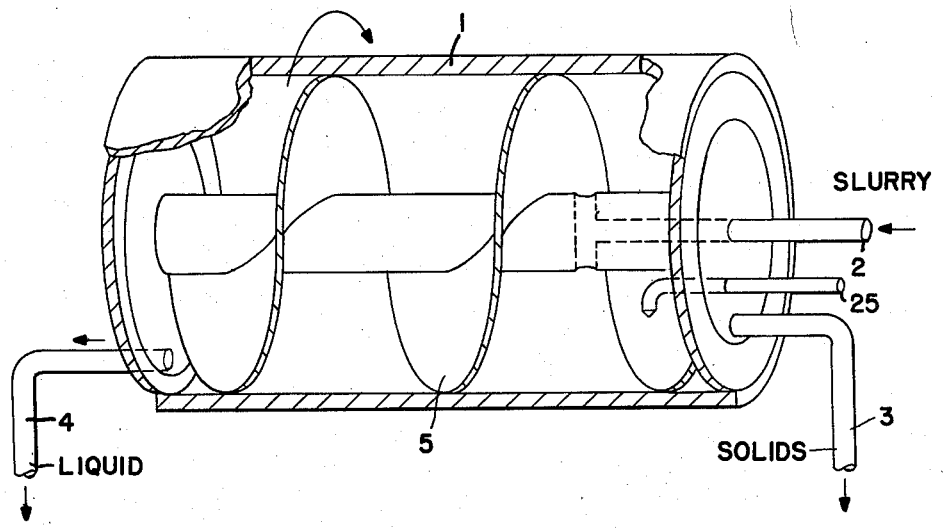
Figure 3:
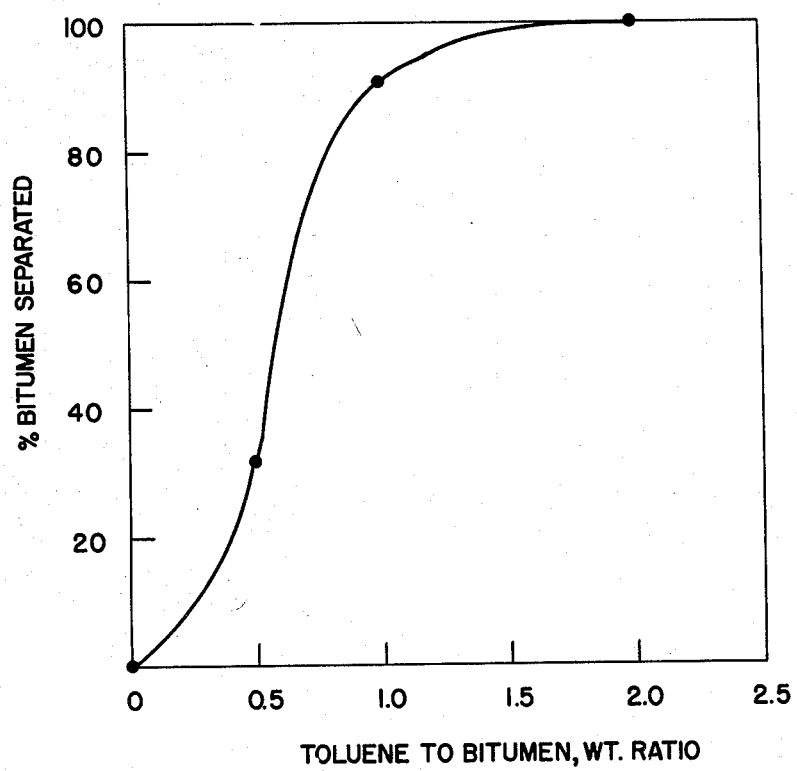
Figure 4:
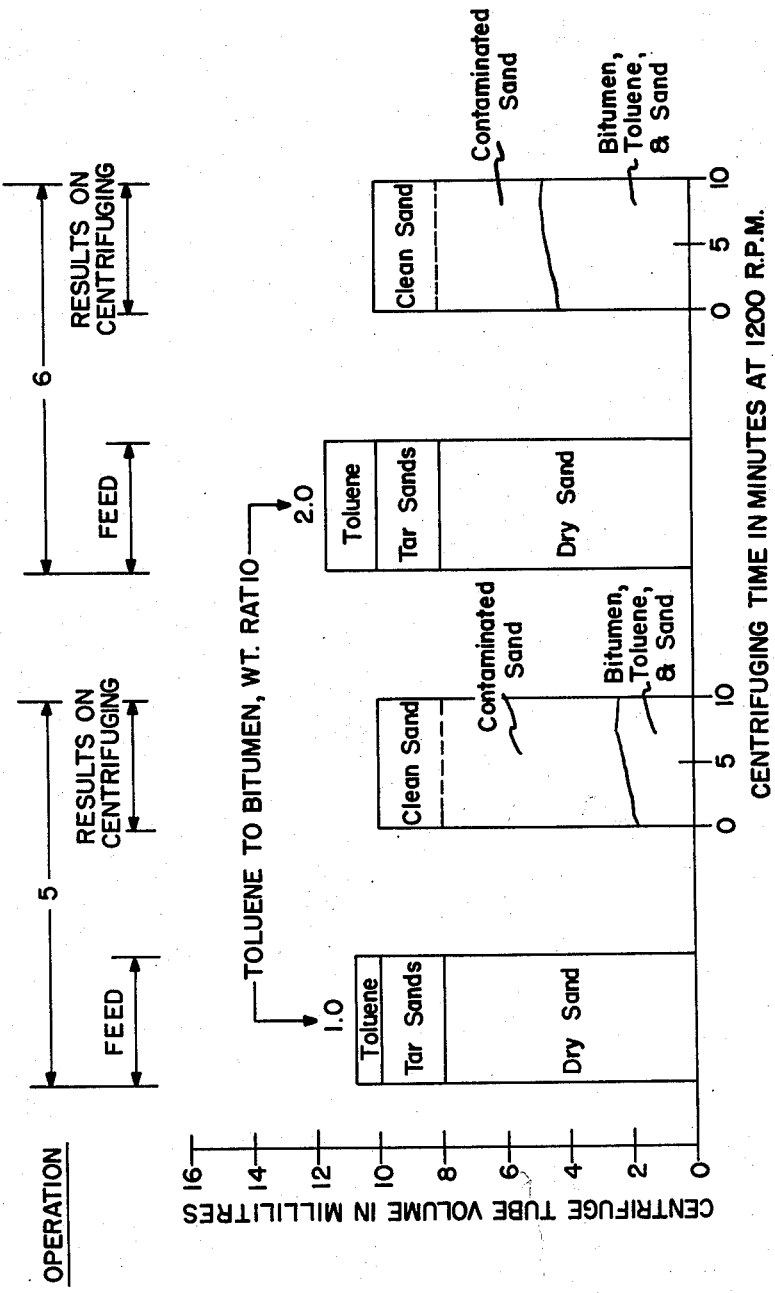
Figure 5:
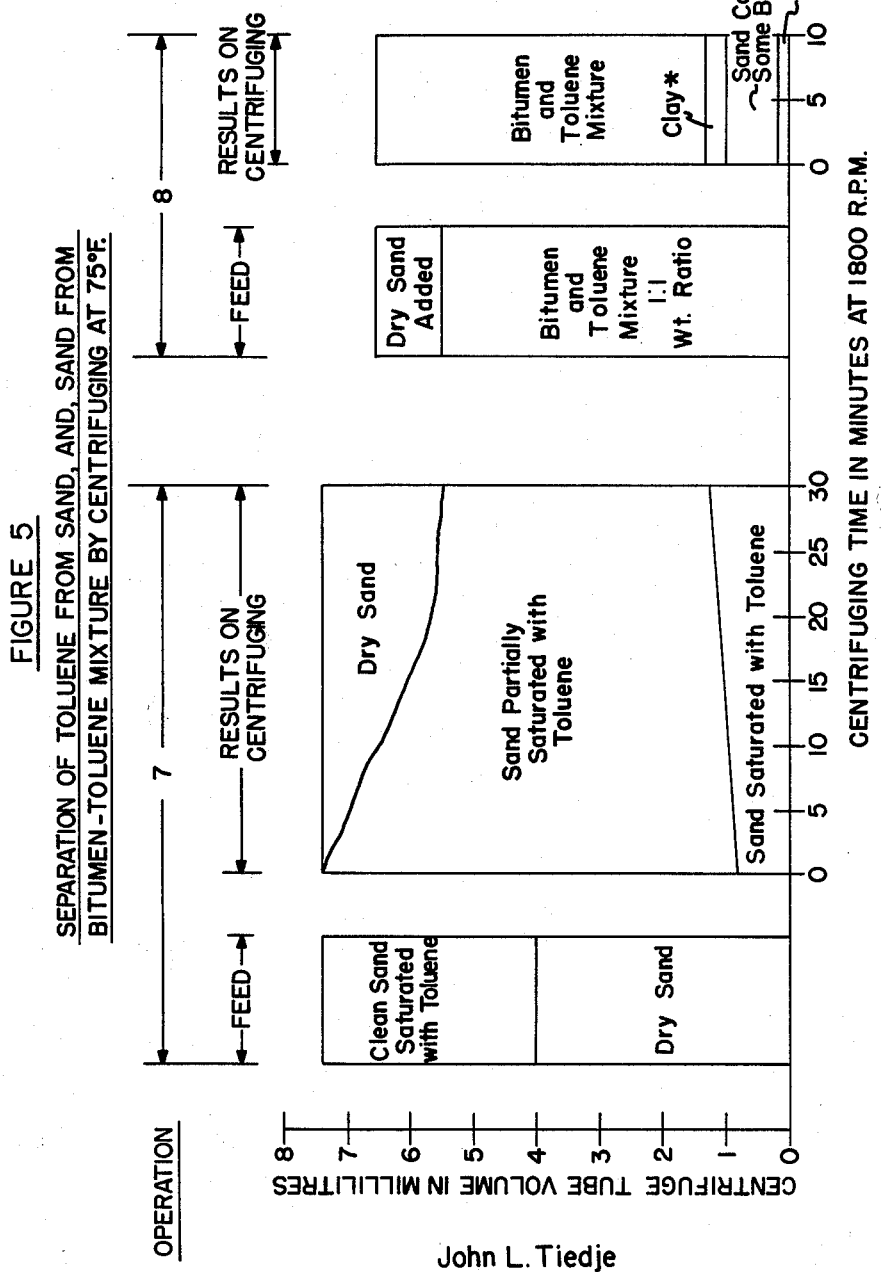
Figure 6:
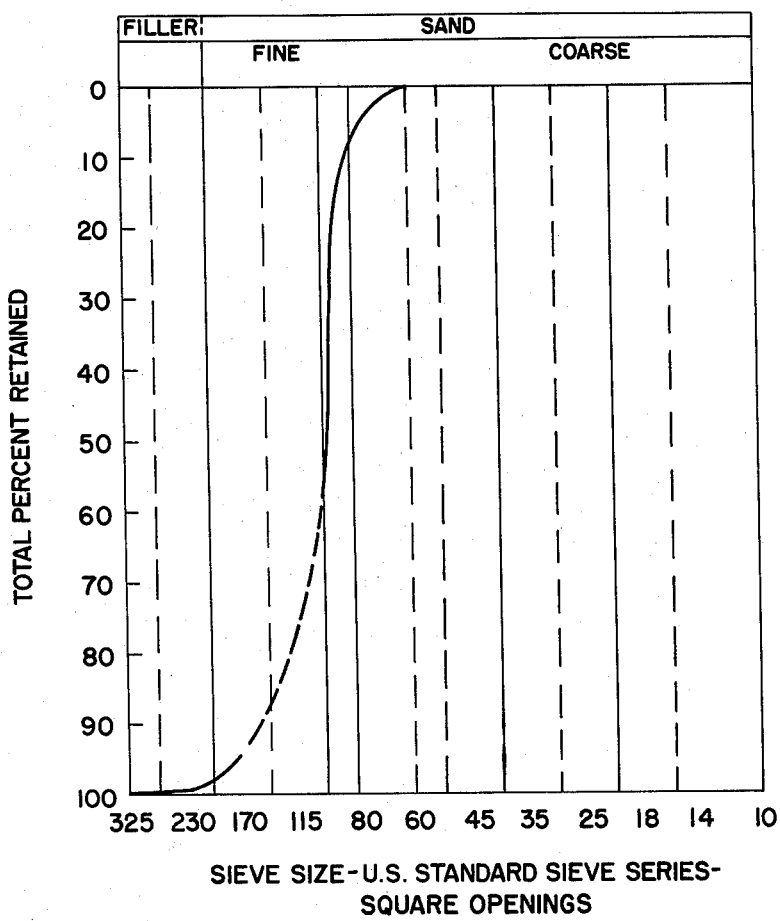

The process of the present invention may be readily understood by reference to the figures illustrating the same. FIG. 1A illustrates a preferred frusto conical type of centrifuge, while FIG. 1B illustrates a cylindrical type centrifuge. FIG. 2 presents data on the separation of bitumen under various conditions. FIG. 3 shows the bitumen separated as a function of the solvent to bitumen ratio. FIG. 4 presents additional data showing the results under different operating conditions. FIG. 5 also presents experimental results under varying operating conditions. FIG. 6 presents data on the size distribution of separated sand as compared with the oil retained. FIG. 7 presents alternate methods, graphically, for the handling of the tar sands.

Referring specifically to FIG. 1A, a frusto conical centrifuge or bowl 1 is suitably mounted and rotated at about 1000 to 3000 gravity times, preferably at about 2000 gravity times. A tar sand solvent-slurry is introduced into an intermediate point within the centrifuge by means of a feed line 2. This feed is introduced, preferably, at about the middle third of the centrifuge. A screw conveyor or scroll with suitable fins is rotated within the centrifuge. The solvent used may comprise any satisfactory solvent, such as naphtha, a gas oil fraction or toluene and the like. However, it is preferred that the solvent comprise a fraction of the recovered tar oil secured in a manner as hereinafter described.

The size of the centrifuge may vary appreciably as, for example, from about 2 to 20 feet or longer in length depending upon operating factors. The diameter at the narrow end may be in the range from ½ to 6 feet, or larger while the diameter at the wide end may vary in the range from about 1 to 12 feet, or larger also depending upon operating variables.

Under the conditions of operation, the slurry contains about ½ to 2 grams of solvent per gram of oil in the tar sand being processed. As mentioned, the tar sand is introduced near the middle third of the tapered bowl. Gravitational forces remove the hydrocarbons outwardly towards the wide end of the bowl, which hydrocarbons are removed by means of line 4 and handled as desired. The sand is moved by the screw conveyor up to the incline to the narrow end of the bowl and is removed by line 3.

A preferred adaptation of the invention is to remove the oil recovered by means of line 4 and to pass this stream to a fractionation unit wherein the same is divided into several streams. One stream comprises a gas oil stream having an end point in the range of about 600 to 7000° F. A portion of this stream is then used as solvent to slurry the tar sands which slurry is introduced into the unit by means of line 2.

In accordance with a preferred and especially desirable adaptation of the present invention, a portion of the recycle solvent is introduced into bowl 1 by means of line 25 at a point intermediate the point of introduction of the tar sand slurry and the point of withdrawal of the sands by means of line 3. This in effect will secure a countercurrent washing of the tar sands approaching line 3 and the downflowing solvent introduced by means of line 25. In general, it is preferred that from about 25–75% of the total solvent be introduced in this manner so as to secure countercurrents flow of the solvent and the tar sands.

Under certain conditions, such as a low angle of repose of the dry sand, 3½°, it may be impractical to completely dry the sand and thus it may be discharged wet with solvent. Under these conditions, the sand containing a small amount of solvent is removed by means of line 6 and introduced into a solvent recovery unit 7 which preferably comprises a centrifuge. The solvent is removed by means of line 8 and recycled as desired, while the dry sand is removed by means of line 9. It is evident that the unit, as described, contains no filtering surfaces in the centrifuge which can become plugged with fine sand.

FIG. 1B describes an apparatus similar to that described with respect to FIG. 1A except that the bowl comprises a cylindrical unit. Similar elements on FIGS. 1A and 1B are similarly numbered. It is preferred that the cylindrical element be not horizontal so as to secure gravity flow of the extracted oil downwardly along the surface of the bowl and countercurrent to the extracted sand. Relative movement of the screw conveyor and the bowl is maintained so as to secure upward movement of the sand being extracted. For example, the rotation of the bowl may be in the range from 1500 to 2500 r.p.m., preferably about 2000 r.p.m., while the relative movement of the screw conveyor may range from about 1300 to 2300 r.p.m., preferably about 1800 r.p.m.

The invention, as described, requires that the tar sands be mixed with a solvent or hydrocarbon diluent, preferably a fraction of the recovered oil, and the bitumen, plus solvent mixture, be separated from the sand by means of a centrifugal force, utilizing a continuous solid bowl. The mixing of the solvent with the tar sands may be carried out, preferably, prior to the centrifuging operation, but also may be carried out during the centrifuging operation. Suitable solvents are, for example, a fraction of the recovered oil, toluene, benzene, and gas oil fractions.

It will be noted that the degree of separation for the experiments using solvent has been expressed as the weight percent bitumen separated. The S-shaped curve obtained, shows that at toluene to bitumen ratios less than 2.0, various degrees of separation are achieved, at the conditions used in these experiments. However, at a toluene to bitumen ratio of 2.0, essentially complete separation can be obtained even at the low centrifuge speed used, about 1200 r.p.m.

A number of operations were carried out to demonstrate the present invention with the following results.

Example I

The need and the quantity of solvent, in this case toluene, required to effect separation by centrifuging (1000 g.) is shown in FIG. 2. The following should be noted in connection with this diagrammatic illustration of the results of these experiments:

(1) The composition of the centrifuge tube used in a particular experiment is shown as a function of time. The composition of the feed is shown at the left of the diagram.

(2) The amount of toluene used is expressed as a weight ratio to the bitumen content of the tar sands.

(3) The dry sand used in the original composition was completely free of bitumen. It was used as a support for the tar sands, as well as a "sink" for the bitumen and toluene mixture, which was centrifuged from the original tar sands and toluene mixture.

(4) The tar sands sample used contained about 21 weight percent bitumen.

It is evident from FIG. 2 that no bitumen is separated from the tar sands by centrifuging alone, both at 75° F. and at 140° F. However, mixing of toluene with the tar sands and centrifuging did achieve separation and the higher the solvent to bitumen ratio the more rapid the separation. In the case of the 1:1 toluene to bitumen ratio experiments, no effect of raising temperature from 75° F. to 140° F. was found. Although better separation would be expected at the higher temperature, this was not obtained as some loss of toluene occurred by vaporization at the higher temperature, hence reducing the toluene to bitumen ratio to a smaller, unknown value.

A sample of the "separated" sand from the top of each centrifuge tube was taken and weighed. The weighed sample of "separated" sand was extracted with a known weight of pure isooctane, then with toluene. The toluene was removed by evaporation, and the sand sample was weighed to a constant weight. These operations were carried out in the same container, so that no sand loss occurred. The bitumen plus toluene content of the "separated" sand was obtained directly by differences in weight. The results of these operations gave the degree of separation obtained in the experiments illustrated in FIG. 2 which results are plotted in FIG. 3.

Example II

Two further experiments are shown diagrammatically in FIG. 4. Here the toluene was not mixed with the tar sands, instead it formed a layer above the dense tar sands supported on dry sand. On centrifuging, the toluene rapidly penetrated the tar sands and removed all the bitumen, leaving a clean free running sand. These experiments show the effectiveness of a countercurrent extraction in this type of process. The efficiency of separation was 100% both at 1.0 and 2.0 toluene to bitumen ratio. However, the tar sands at the top of the bed, which was completely free of bitumen and toluene at the end of the experiment, received a much higher toluene to bitumen treat than indicated by the over-all weight ratio used.

Example III

Two other experiments are shown in FIG. 5. It can be seen that toluene can be separated from sand by centrifuging. The time to free the sand of toluene, however, appears to be considerably longer than that to remove essentially all the toluene and bitumen mixture from the sand. (Compare with FIG. 2.) This fact is important to the commercial application of this process. It can also be seen from FIG. 5 that the sand can be readily removed from a 1.0 weight ratio of toluene to bitumen mixture. The clay that also separated was known to be suspended in the sample of bitumen used. This clay is a main cause of recovery and separation problems in the conventional water separation process. The proposed process, herein described, has the advantage of removing all the clay directly with the separated bitumen. The experiments show that, with a solvent and a centrifugal force, bitumen can be separated easily and completely from tar sands, and that the sands can move countercurrent to the bitumen.

Example IV

In operation the centrifuge will have a solid bowl with no filtering medium. Experiments on separating the bitumen by washing with solvent in a Buchner funnel were severely limited by plugging of the filter cloth. This is due to the very small particle size of the sand as shown in FIG. 6.

Essentially, the tar sands or a slurry of tar sands and solvent would be fed into the centrifuge with or without the addition of solvent at a location to the right of the feed inlet (FIG. 7, Examples B and C), to achieve countercurrent extraction. The separated bitumen and solvent mixture is withdrawn from one end and the sand from the other.

The angle of repose for the dry, clean, free running sand is 3½°. This necessitates a very low angle for the centrifugal bowl as shown in FIG. 1. However, with very short residence times in the primary separation, the sand is wet with solvent, and thus enables the use of a much higher angle for the bowl. The sand is then separated from the solvent in a separate operation, such as, centrifuging or steaming, etc. These processes are illustrated in FIG. 7.

In Example A of FIGURE 7, the tar sands are introduced into zone 11 along with solvent, preferably recycle solvent, by means of line 13. Rocks and extraneous material are removed by means of line 12. The slurry is introduced into centrifuge extraction zone 18 by means of line 20 as hereinbefore described. The bitumen is removed by means of line 17 and passed to fractionation zone 15 wherein the bitumen is segregated into the desired number of fractions, including solvent, which streams are removed by means of lines 13, 14 and 16.

As pointed out, it is preferred that the solvent utilized in zone 11 comprise recycle solvent secured as described. Tar sands, which are preferably wet with solvent, are removed by means of line 19 and passed to a separation zone 24 wherein the solvent is separated from the sand, which is removed by means of line 22, and the recovered solvent recycled by means of line 21.

In operation B, tar sands are introduced into separation and mixing zone 31 by means of line 30 while the solvent is introduced by means of line 33. Rocks and extraneous materials are removed by means of line 32. In this operation the slurry is introduced into about the middle third of the centrifuge extraction zone. Bitumen and solvent are removed by means of line 38 and passed to separation zone 36. A light fraction is removed overhead by means of line 37 while the bitumen bottoms is removed by means of line 42. A recycle solvent fraction is removed by means of line 39 and segregated into two streams, one of which is introduced by means of line 33 into zone 31 while the second stream is introduced into zone 34 by means of line 35. Sand, preferably wet with solvent, is removed from zone 34 by means of line 41. In accordance with this adaptation of the present invention the recycle solvent introduced into zone 34 by means of line 35 is introduced at a point intermediate the point of introduction of the slurry and the point of withdrawal of the sand. The sand removed by means of line 41 is handled in a manner to remove solvent which is recycled by means of line 40. Dry sand is removed by means of line 43 and handled as desired.

In Example C of FIGURE 7, tar sands are introduced into zone 51 by means of line 50 in a manner to separate rocks and extraneous material which are removed by means of line 52. The tar sands are then introduced into centrifuge extraction zone 54 by means of line 62 at about the middle third of the extractor. Sand is removed from extractor 54 by means of line 55 and may be handled in a manner described with respect to Examples A and B. Bitumen and solvent are removed from zone 54 by means of line 59 and introduced into separation zone 58. This stream is separated into several fractions which are withdrawn by means of lines 57, 56 and 61. The recycle solvent is removed by means of line 56 and introduced into zone 54 at a point intermediate the point of introduction of the tar sands and the point of withdrawal of the extracted sands. Extraneous solvent may be introduced into the system by means of line 60.

Thus, in essence the present invention is concerned with a tar sand extraction operation wherein no water or no filters are utilized. In accordance with the preferred adaptation of the invention countercurrent flow is secured between the solvent and the sands being extracted. It is preferred not to dry the sands completely in order to secure a high angle of repose and thereafter dry the sands completely in a second stage, preferably using a second centrifuge extractor.

What is claimed is:

1. Process for the removal of bitumen from tar sands which comprises introducing said tar sands as an oil solvent slurry at an intermediate point of a frustro conical type centrifuge zone operating on a horizontal axis and centrifuging the same, allowing extracted oil to flow by gravity downwardly and be withdrawn from the lower end of said centrifuge zone, fractionating said oil to separate a gas oil fraction and mixing a portion of said fraction with the tar sands introduced into said intermediate point, causing extracted tar sands to move upwardly toward the upper end of said centrifuge zone by rotating means at a speed different from the speed of rotation of said centrifuge zone, withdrawing extracted sand from the upper end of said centrifuge zone, treating said sand in a second stage to separate solvent therefrom and introducing a second solvent stream into said centrifuge zone at a point intermediate the point of introduction of said slurry and the point of withdrawal of said extracted sands.

2. Process as defined by claim 1 wherein the amount of solvent utilized is 1 to 2 wt. percent based upon the amount of oil present in said tar sands and wherein the amount of solvent introduced intermediate the point of introduction of said slurry and the point of withdrawal of said tar sands is about 30 to 70% by weight of the total solvent used.

3. Improved process for the removal of hydrocarbons from tar sands which comprises mixing from about ½ to 2 grams of solvent oil per gram of oil in said tar sands to form a slurry, said solvent oil boiling in the range from about 600° to 700° F., thereafter introducing said tar sands slurry at an intermediate point of a frustro conical centrifuge zone operating on a horizontal axis and centrifuging the same, moving separated sand upwardly through said centrifuge zone and removing said sand from the upper end of said centrifuge zone, removing separated hydrocarbons from the lower end of said centrifuge zone, processing said hydrocarbons removed from said lower end of said centrifuge zone to secure said solvent, and introducing a portion of said solvent into said centrifuge zone at a point intermediate, the point of introduction of said tar sands slurry and the point of withdrawal of said sands from the upper end of said centrifuge zone.

4. Process as defined by claim 3 wherein said means for moving said sand upwardly through said centrifuge zone is rotated at about 1800 r.p.m. and said centrifuge zone is rotated in the range from about 1500 to 2500 r.p.m.

References Cited in the file of this patent

UNITED STATES PATENTS

| | | |
|---|---|---|
| 1,520,752 | Horwitz | Dec. 30, 1924 |
| 1,864,856 | Pier et al. | June 28, 1932 |
| 2,703,676 | Gooch | Mar. 8, 1955 |
| 2,795,635 | McBride | June 11, 1957 |
| 2,825,677 | Coulson | Mar. 4, 1958 |
| 2,968,603 | Coulson | Jan. 17, 1961 |

FOREIGN PATENTS

| | | |
|---|---|---|
| 596,561 | Canada | Apr. 19, 1960 |